(12) United States Patent
Nanni, Jr. et al.

(10) Patent No.: US 6,866,064 B2
(45) Date of Patent: Mar. 15, 2005

(54) COUPLING ASSEMBLY HAVING A COUPLING MEMBER REMOVABLY SECURABLE IN AN APPARATUS

(75) Inventors: Bernardino P. Nanni, Jr., Jerome, MI (US); Alexander P. Webster, Concord, MI (US)

(73) Assignee: Eaton Corporation, Cleveland, OH (US)

( * ) Notice: Subject to any disclaimer, the term of this patent is extended or adjusted under 35 U.S.C. 154(b) by 78 days.

(21) Appl. No.: 10/307,024

(22) Filed: Nov. 29, 2002

(65) Prior Publication Data

US 2004/0103946 A1 Jun. 3, 2004

(51) Int. Cl.$^7$ .............................................. F16L 37/28
(52) U.S. Cl. ................. 137/614.03; 137/327; 137/614; 137/15.09; 285/316
(58) Field of Search .......................... 137/614.03, 614, 137/614.04, 15.09; 285/316

(56) References Cited

U.S. PATENT DOCUMENTS

| | | | | |
|---|---|---|---|---|
| 2,823,048 A | * | 2/1958 | Hansen | 251/149.6 |
| 4,612,953 A | * | 9/1986 | Caroll et al. | 137/327 |
| 5,215,122 A | * | 6/1993 | Rogers et al. | 137/614.04 |
| 5,226,682 A | | 7/1993 | Marrison et al. | |
| 5,398,723 A | * | 3/1995 | Allread et al. | 137/614.03 |
| 5,406,980 A | * | 4/1995 | Allread et al. | 137/614.03 |
| 5,546,985 A | * | 8/1996 | Bartholomew | 137/614.04 |
| 5,553,895 A | | 9/1996 | Karl et al. | |
| 5,570,910 A | | 11/1996 | Highlen | |
| 6,447,024 B1 | | 9/2002 | Olson | |

* cited by examiner

*Primary Examiner*—A. Michael Chambers
(74) *Attorney, Agent, or Firm*—Rader, Fishman & Grauer PLLC (57) ABSTRACT

A coupling assembly is provided that includes a first coupling member removably securable in an apparatus having a port that includes a receiving groove, a retaining surface and a resilient locking member receivable in the receiving groove. The first coupling member includes a body extending along an axis from a leading portion configured for receipt within the port of the apparatus to a trailing portion configured to releasably connect the first coupling member to a second coupling member. The body includes a rib having a ramp tapering outwardly in a direction way from the axis and a shoulder tapering inwardly toward the axis. The coupling member and port are sized such that upon insertion of the first coupling member into the port, the resilient locking member travels up the ramp and then contracts becoming trapped between the shoulder and the retaining surface to secure the first coupling member to the apparatus.

36 Claims, 12 Drawing Sheets

COUPLING ASSEMBLY HAVING A COUPLING MEMBER REMOVABLY SECURABLE IN AN APPARATUS

BACKGROUND OF THE INVENTION

1. Field of the Invention

The present invention relates generally to coupling assemblies for connecting two members together and more particularly to a releasable coupling assembly having at least one coupling member removably securable in an apparatus.

2. Description of the Related Art

Coupling assemblies that include male and female coupling members are known in the art. In one common configuration, the individual male and female components of a coupling assembly are each connected to a corresponding apparatus or member, and are then secured together to provide the apparatus in fluid communication with the member. For example, the male portion of the coupling assembly may be attached to a hydraulic pump manifold and the female portion of the coupling assembly may be connected to a hydraulic device, such as a hydraulic cylinder. When the female coupling member is attached to the male coupling member, the hydraulic cylinder is provided in fluid communication with the hydraulic pump.

A convenient feature of coupling assemblies is that they can be made "self-sealing," meaning they can be disconnected from one another without significant fluid loss from the system. For example, in the above described hydraulic circuit, the female coupling member can be disconnected from the male coupling member without significant loss of hydraulic fluid from the pump or the cylinder. Self-sealing coupling assemblies are typically provided with quickconnect/disconnect features that allow them to be repeatedly connected and disconnected.

As will be appreciated, during the life of a coupling assembly, repeated connection and disconnection of the assembly may cause one or both of the coupling members to become damaged or otherwise inoperable, requiring replacement. Conventional coupling members typically include a threaded portion that is configured to engage an appropriately threaded port in the mating apparatus. This configuration exhibits several limitations. Among other things, manufacture of the threaded portion of the coupling assembly and threaded port of the apparatus generally require the use of more complex or involved machining techniques, which can be costly and/or inefficient to manufacture. Moreover, installation of the coupling member into the port is often tedious, requiring the installer to thread the coupling member into the port and securely tighten the coupling member in place using a wrench. Once installed, the threaded coupling member is secured in a fixed position in the apparatus, unable to rotate or pivot relative to the apparatus. Further, the threaded interface between the coupling member and the port can become corroded, making removal of the coupling member difficult.

SUMMARY OF THE INVENTION

A coupling assembly is provided that includes first and second coupling members. The first coupling member is removably securable in an apparatus having a port that includes a receiving groove, a retaining surface and a resilient locking member receivable in the receiving groove. The first coupling member includes a body extending along an axis from a leading portion configured for receipt within the port of the apparatus to a trailing portion configured to releasably connect the first coupling member to the second coupling member. The body includes a rib having a ramp tapering outwardly in a direction way from the axis and a shoulder tapering inwardly toward the axis. The first coupling member and port are sized such that upon insertion of the first coupling member into the port, the resilient locking member travels up the ramp and then contracts becoming trapped between the shoulder and the retaining surface to secure the first coupling member to the apparatus.

As will be appreciated, the first coupling member is easily securable in the port of an apparatus without threading the coupling member into the port or tightening the coupling member into the port using a wrench. Once installed, the first coupling member functions as a self-sealing coupling member allowing the apparatus to contain fluid without leakage. The first coupling member can also rotate within the port of the apparatus about the axis of the coupling member. Additionally, the first coupling member can pivot or articulate slightly within the port to accommodate misalignment of the second coupling member during connection. If needed, the first coupling member can be quickly and easily removed from the apparatus using a convenient release tool.

Various additional aspects of this invention will become apparent to those skilled in the art from the following detailed description of the preferred embodiment, when read in light of the accompanying drawings.

DESCRIPTION OF THE PREFERRED EMBODIMENT

Figure 1:
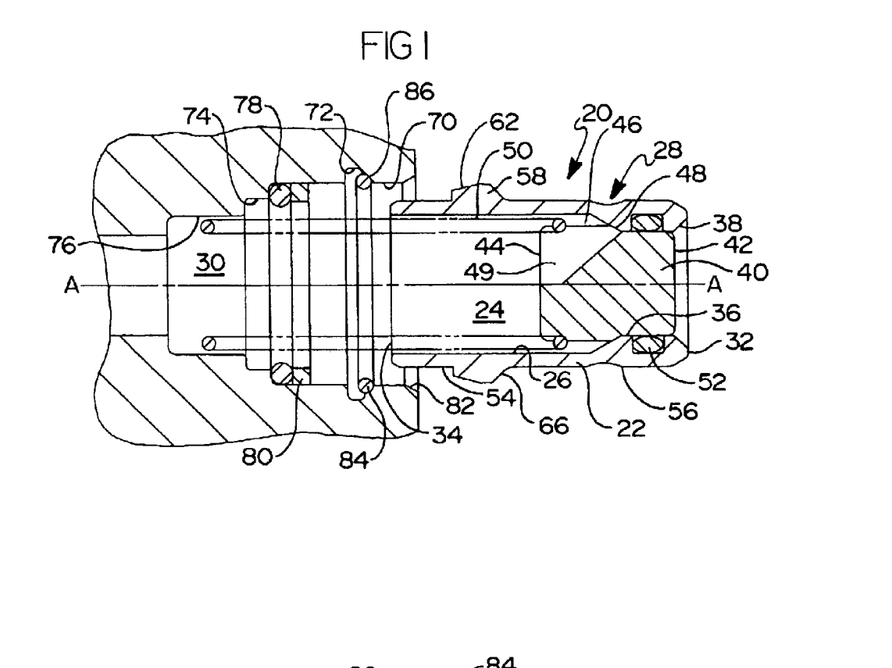
FIG. 1 is a cross-sectional view of a first coupling member according to the present invention prior to insertion into a port in an apparatus.
Figure 2:
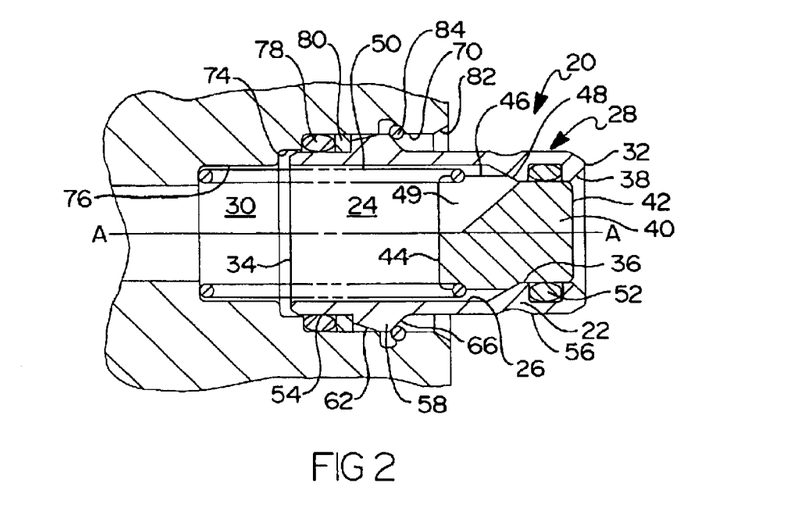
FIG. 2 is a cross-sectional view of the first coupling member of FIG. 1 secured in the apparatus port.

Referring now to the drawings, the preferred embodiments of the present invention are shown in detail. Referring to FIGS. 1 and 2, a first or "port" coupling member 20 is shown that includes a generally cylindrically-shaped body 22 having a central longitudinal channel 24 and an inner and outer surface 26 and 28, respectively. For illustration, first coupling member 20 is shown in FIGS. 1 and 2 as a "male" coupling member, although coupling member 20 could also function as a "female" coupling member, as will be described in further detail below. Coupling member 20 is configured to be secured in a port 30 of an apparatus, such as a pump manifold or housing.

Central longitudinal channel 24 of body 22 extends from an external end 32 to an internal end 34. In the disclosed embodiment, a portion of inner surface 26 tapers inwardly toward external end 32 where it meets an interior cylindrical surface 36. External end 32 includes a chamfered surface 38 that tapers inwardly toward interior cylindrical surface 36.

Figure 8A:
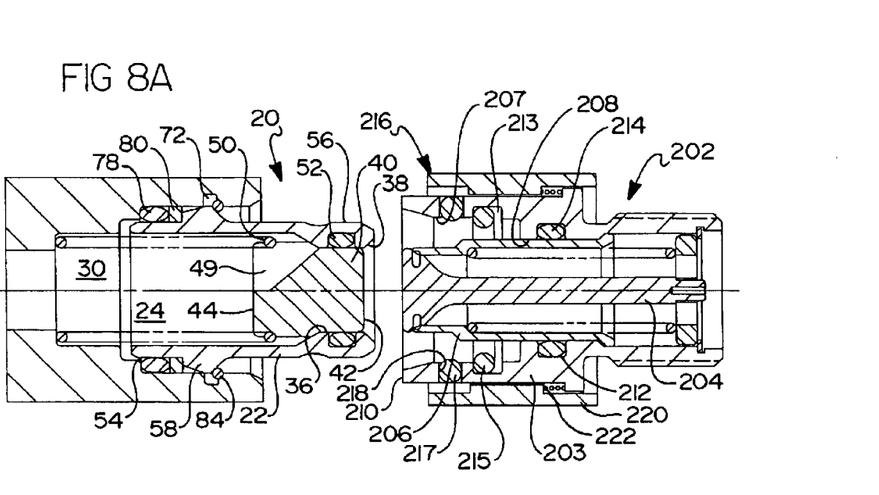
FIGS. 8A–8D are cross sectional views of the coupling assembly of the present invention showing the first coupling member secured in the apparatus port during connection of the second coupling member.
Figure 8B:
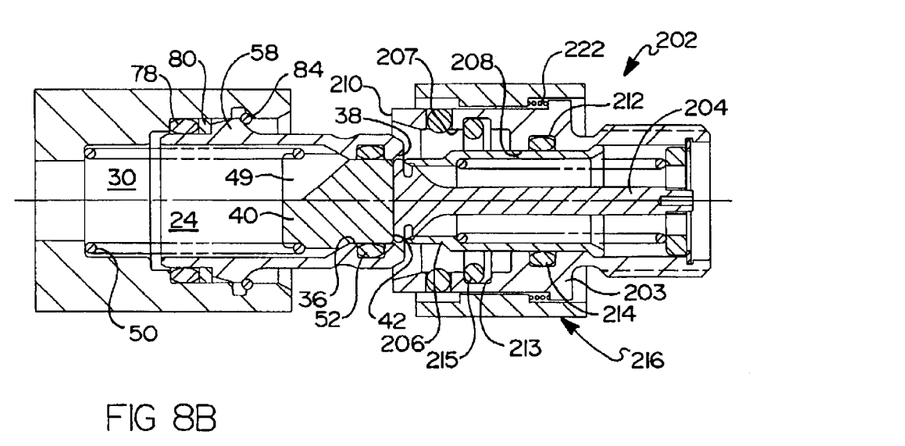
Figure 8C:
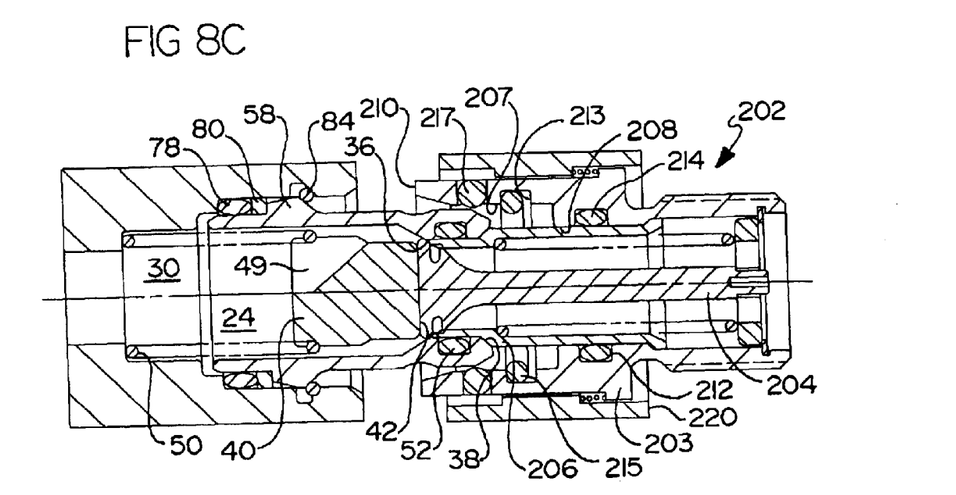
Figure 8D:
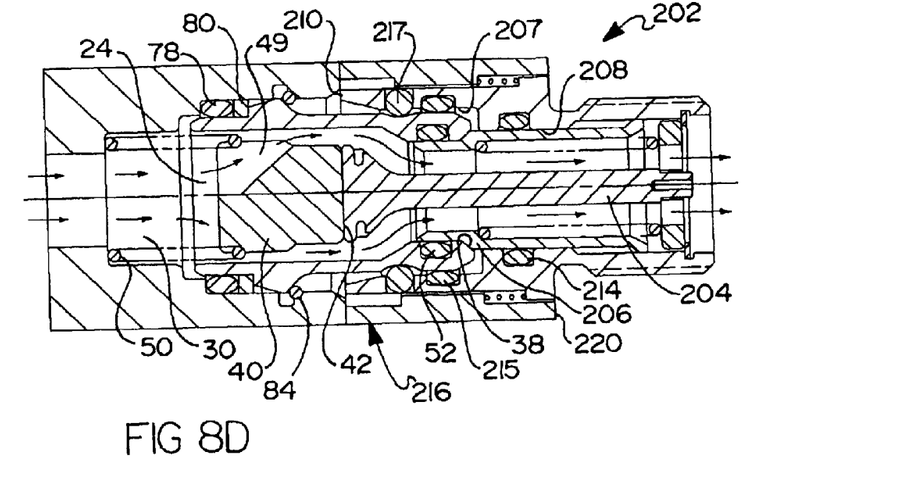

An axially moveable valve member 40 is disposed within channel 24 for movement between a closed or sealed position (FIG. 8A) and an open position (FIG. 8D). Valve member 40 is generally cylindrically-shaped and extends from a leading end 42 to a trailing end 44. An exterior surface 46 of valve member 40 includes a tapered shoulder 48, which engages the portion of inner surface 26 that tapers inwardly toward external end 32 of body 22 when valve member 40 is in the closed position. Trailing end 44 is provided with a plurality of radially extending fins 49, which are circumferentially separated to allow fluid flow around valve member 40 when moved to the open position.

Valve member 40 is biased into the closed position by a resiliently compressible member 50, such as a compression spring, which is disposed between a bottom surface of port 30 and valve member 40. The end of compressible member 50 that contacts valve member 40 is disposed in a groove located in each of the fins 49.

At least one annular sealing member 52, such as an o-ring, is deployed between valve member 40 and body 22 to inhibit the passage of fluid therebetween when valve member 40 is in the closed position. Sealing member 52 may be disposed in a groove in interior cylindrical surface 36 (as shown in FIGS. 1 and 2) for engagement with exterior surface 46 of valve member 40, or in a groove in valve member 40 for engagement with interior cylindrical surface 36 (not shown).

Figure 6:
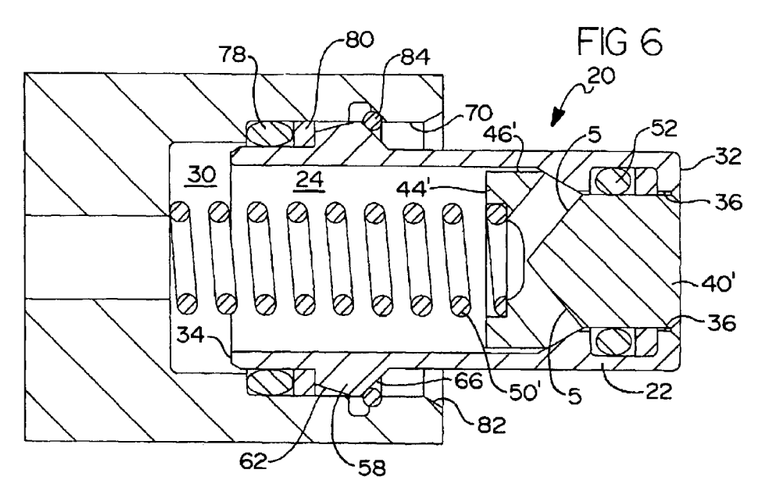
FIG. 6 is a cross-sectional view of the first coupling member according to another embodiment of the present invention.

Another embodiment of valve member 40 is shown in FIG. 6. In this embodiment, a valve member 40' is shown that is substantially similar to valve member 40 with at least one exception, namely, valve member 40' includes channels 51 that extend from an exterior surface 46' of valve member 40' inwardly toward a trailing end 44'. In this embodiment, a lesser diameter compressible member 50' may be used to bias valve member 40' toward the closed position.

Figure 7:
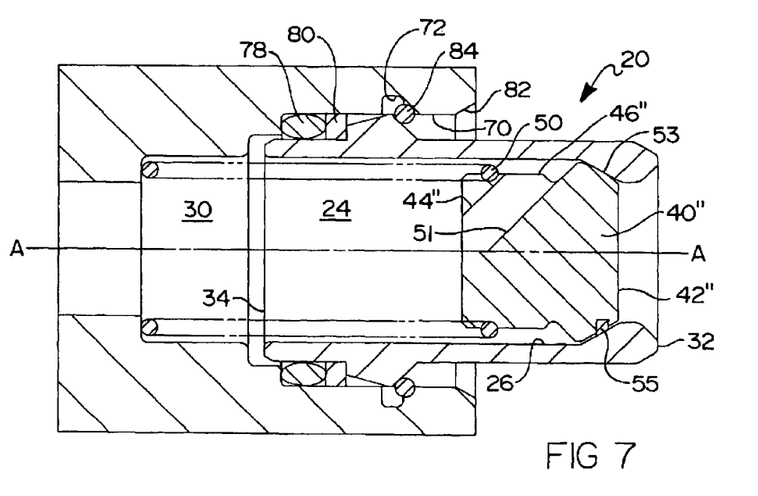
FIG. 7 is a cross-sectional view of the first coupling member according to another embodiment of the present invention.

Yet another embodiment of valve member 40 is shown in FIG. 7. In this embodiment, a valve member 40" is shown that is substantially similar to valve member 40 with at least one exception, namely, valve member 40" includes a chamfered surface 53 that extends outwardly away from a leading end 42". In one embodiment of valve member 40", shown in the upper half of FIG. 7, chamfered surface seals directly against the inwardly tapering portion of inner surface 26 when valve member 40" is moved to the closed position shown in FIG. 7. In another embodiment, shown in the lower half of FIG. 7, chamfered surface 53 includes an annular sealing member 55 therein, which sealingly contacts the inwardly tapering portion of inner surface 26 when valve member 40" is moved to the closed position shown in FIG. 7. Sealing member 55 may be a metallic or elastomeric material. Valve member 40' also includes at least one channel 51 that extends from an exterior surface 46" of valve member 40" inwardly toward a trailing end 44".

Referring again to FIGS. 1 and 2, outer surface 28 of body 22 includes a leading or forward surface portion 54 and a trailing or rearward surface portion 56 separated by an outwardly extending rib 58. In an embodiment of the present invention (see FIG. 3A for greater detail), rib 58 includes a wall 60 that extends radially outward from leading surface portion 54. A tapered ramp 62 extends rearwardly and outwardly from wall 60 at a predetermined angle relative to an axis A—A (shown in FIGS. 1 and 2), which is common to both coupling member 20 and port 30 when coupling member 20 is secured therein. Ramp 62 extends to a cylindrical surface 64 that is generally parallel to axis A—A and extends rearwardly from ramp 62 a predetermined distance. Rib 58 also includes a shoulder 66 that tapers rearwardly and inwardly from cylindrical surface 64 at a predetermined angle to meet the trailing or rearward surface portion 56. Alternatively, rib 58 may be configured such that ramp 62 and shoulder 66 converge to a single point without a cylindrical surface 64 in between.

Referring again to FIGS. 1 and 2, port 30 includes a first interior surface 70 and a receiving groove 72 that extends outwardly from first interior surface 70. Second and third interior surfaces 74 and 76, respectively, which are substantially parallel to first interior surface 70, cascade inwardly toward axis A—A. Second interior cylindrical surface 74 is sized to receive the leading or forward surface portion 54 of body 22. The step between second and third interior cylindrical surfaces 74, 76 is engaged by internal end 34 to limit the travel of coupling member 20 into port 30. Alternatively, first interior surface 70 may function as two discrete surfaces on either side of groove 72, each having a different diameter.

Once connected, the resulting space between first interior cylindrical surface 70 and forward surface portion 54 of body 22 is sized to receive an annular sealing element 78, such as an o-ring. Optionally, a rigid backing ring 80 may be disposed adjacent annular sealing element 78 to protect annular sealing element 78 from damage during insertion of body 22 into port 30. Rigid backing ring 80 also serves to protect annular sealing element 78 from damage when used in systems having high impulse flow of a fluid. Port 30 also includes a chamfered segment 82 that forms an angle relative to first interior cylindrical surface 70.

Positioned in receiving groove 72 is a resilient locking member 84, which is preferably formed of a metal, and more preferably stainless steel. The metal of locking member 84 is spring tempered so that locking member 84 has flexibility to expand and return to its original shape. Preferably, locking member 84 is not continuous, but includes a space between two ends (not illustrated), allowing locking member 84 to expand and contract without altering its annular shape. When coupling member 20 is disconnected from port 30, locking member 84 has an external diameter less than the inside diameter of receiving groove 72, but larger than the diameter of first interior cylindrical surface 70. Additionally, locking member 84 has an internal diameter substantially equal to or, preferably slightly larger than that of trailing portion 56, allowing locking member 84 to tightly engage coupling member 20 when coupling member 20 is secured in port 30. Locking member 84, by virtue of its dimensions, will be retained in receiving groove 72 when coupling member 84 is disconnected from port 30. However, by virtue of it being flexible, the diametrical size of locking member 84 may be expanded as the locking member 84 moves over ramp 62 and cylindrical surface 64 upon insertion of coupling member 20 into port 30.

Port also includes a retaining surface 86 in the vicinity of receiving groove 72. When coupling member 20 is inserted into port 30, split locking member 84 contacts shoulder 66 of rib 58 and retaining surface 86 of port 30 to secure coupling member 20 in port 30.

Figure 3A:
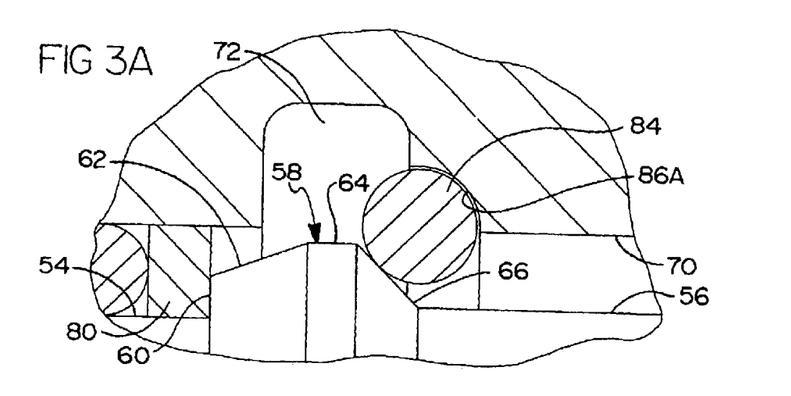
FIGS. 3A–3F are enlarged fragmentary views of alternate embodiments of the invention showing the rib, resilient locking member, receiving groove and retaining surface when the coupling member is secured in the apparatus port.
Figure 3B:
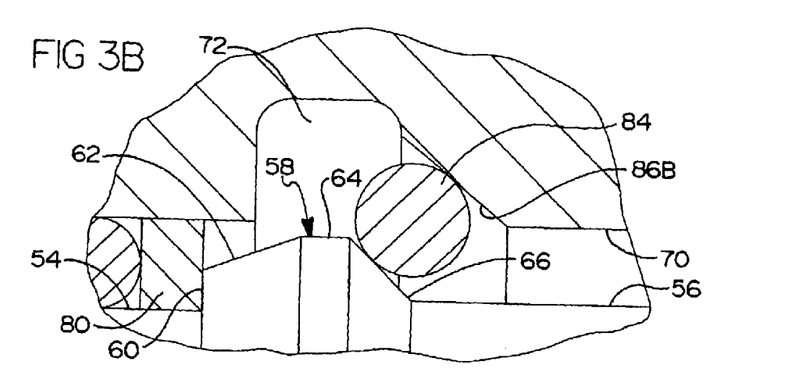

Referring to FIGS. 3A–3F, various embodiments of retaining surface 86, and its relationship to rib 58, split locking member 84 and receiving cavity 72, are shown in detail. In FIG. 3A, port 30 includes a curved retaining surface 86A having a predetermined radius approximately equal to or slightly larger than the radius of locking member 84. In FIG. 3B, port 30 includes a retaining surface 86B in the form of a chamfer that extends at an angle inwardly from receiving groove 72 toward external end 32 of coupling member 20. Preferably, tapered shoulder 66 of rib 58 and chamfer 86B are disposed at converging angles in the direction toward receiving groove 72 when coupling member 20 is secured in port 30 to prevent the locking ring from migrating into receiving groove 72 during connection. This convergence results from the fact that the angle of tapered shoulder 66 is greater than the angle of chamfer 86B in relation to axis A—A.

Figure 3C:
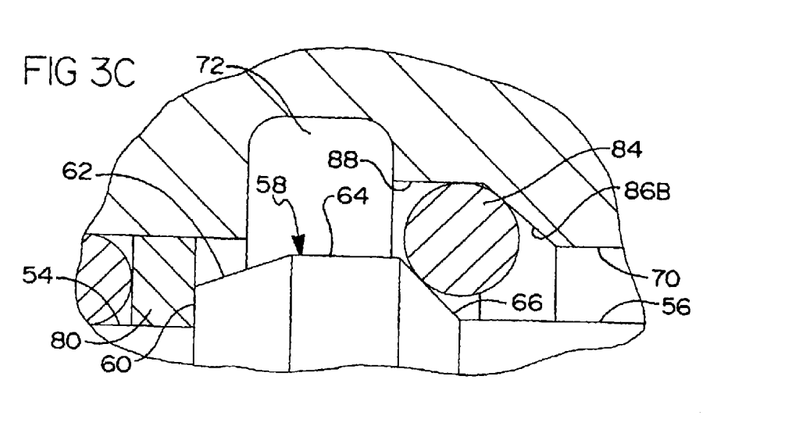
Figure 3D:
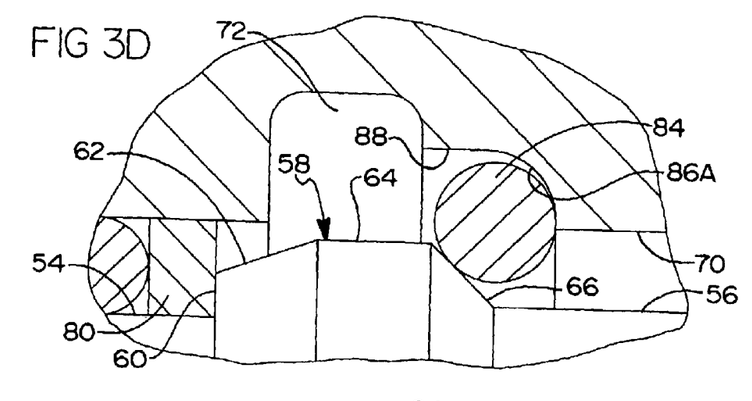

The configuration shown in FIG. 3C is substantially similar to the configuration shown in FIG. 3B, except that port 30 includes at least one intermediate surface 88 between retaining surface 86B and receiving groove 72. To accommodate the increased distance between retaining surface 86B and receiving groove 72, cylindrical surface 64 on rib 58 is lengthened so that tapered shoulder 66 can be positioned to contact locking member 84. Similarly, as shown in FIG. 3D, intermediate surface 88 may also be positioned between retaining surface 86A and retaining groove 72. In the embodiments illustrated in FIGS. 3C and 3D, intermediate surface 88 functions to prevent locking member 84 from migrating into receiving groove 72 during heavy impulse loading or relatively high operating pressures.

Figure 3E:
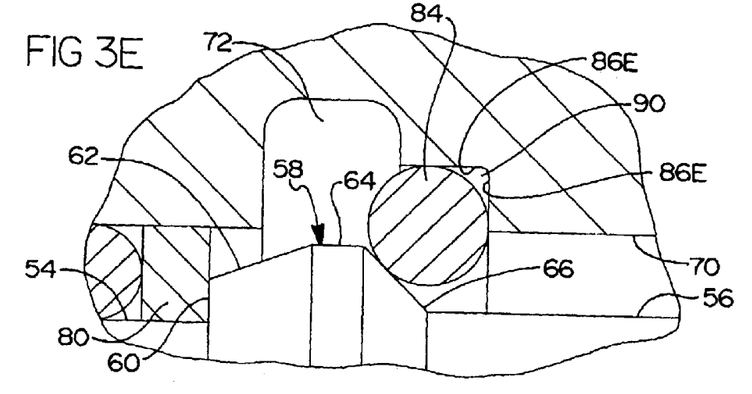

Referring to FIG. 3E, port 30 includes a relatively shallow locking member retaining groove 90 having a pair of retaining surfaces 86E. Retaining groove 90 extends outwardly from first interior cylindrical surface 70 adjacent receiving groove 72. Retaining groove 90 is sized to snugly engage locking member 84 and to prevent member 84 from being released into receiving groove 72 when coupling member 20 is secured in port 30.

Figure 3F:
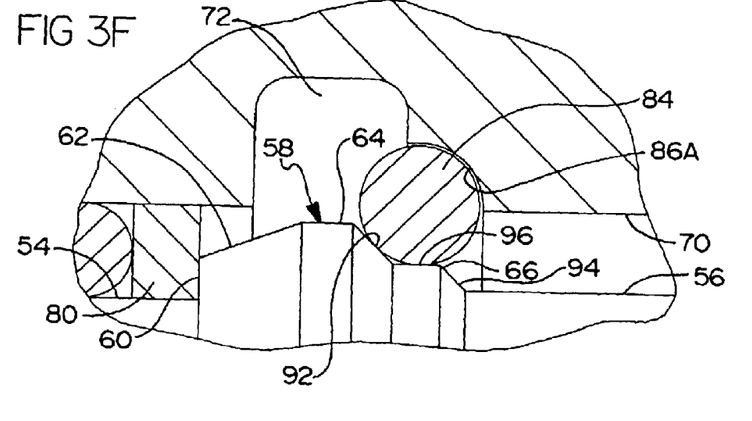

Referring to FIG. 3F, another embodiment of rib 58 is shown. In this embodiment, shoulder 66 includes first and second tapered surfaces 92 and 94, respectively, which are separated by an intermediate cylindrical surface 96. When coupling member 20 is inserted into port 30, locking member 84 contacts against first tapered surface 92, intermediate cylindrical surface 96 and retaining surface 86 to secure coupling member in port 30. Intermediate cylindrical surface 96 inhibits migration of locking member 84 down shoulder 66 when coupling member 20 is secured in port 30. As will be appreciated, this embodiment of shoulder 66 is not limited to use with the engagement surface 86 shown in FIG. 3F, and may suitably function with any of the retaining surfaces shown in FIGS. 3B–3E.

Thus, as may be seen in FIGS. 4A–4E, upon insertion of coupling member 20 into port 30, interior end 34 and leading portion 54 of body 22 will pass through locking member 84 until ramp 62 reaches locking member 84. Continued inward movement of coupling member 20 will cause locking member 84 to be pushed into the larger diameter section of receiving groove 72. Then, continued inward movement of coupling member 20 will cause ramp 62 to expand locking member 84 as locking member 84 moves up ramp 62 and onto cylindrical surface 64 of rib 58. As cylindrical surface 64 moves past locking member 84 upon continued inward movement of coupling member 20, locking member 84, by virtue of its resilience, will contract to a size approaching its original size, and in doing so, will be positioned to prevent the withdrawal of coupling member 20 from port 30 by virtue of locking member 84 contacting shoulder 66 and retaining surface 86.

Once secured in port 30, coupling member 20 may be rotated about axis A—A without locking member 84 becoming displaced from its securing position between shoulder 66 and retaining surface 86, or sealing member 78 becoming disengaged from leading portion 54. This feature is particularly useful when trailing portion 56 of coupling member 20 is configured with an elbow that must extend from the apparatus at a particular angular position to allow connection to a mating coupling member.

Figure 4A:
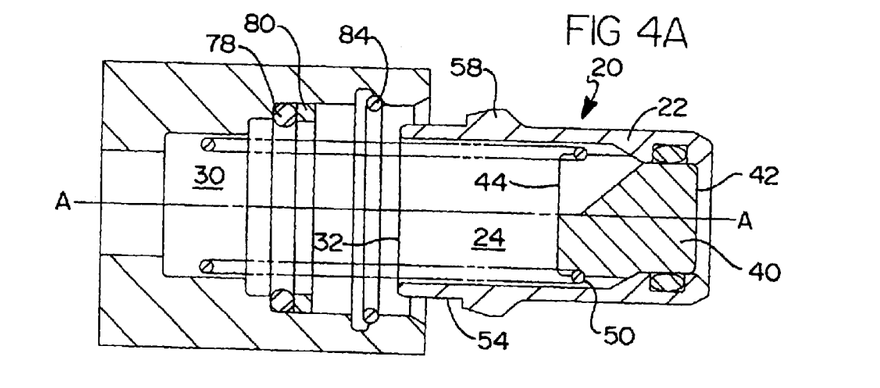
FIGS. 4A through 4E are cross-sectional views similar to FIGS. 1 and 2, but showing the relative positioning of the parts during insertion of the first coupling member into the apparatus port.
Figure 4B:
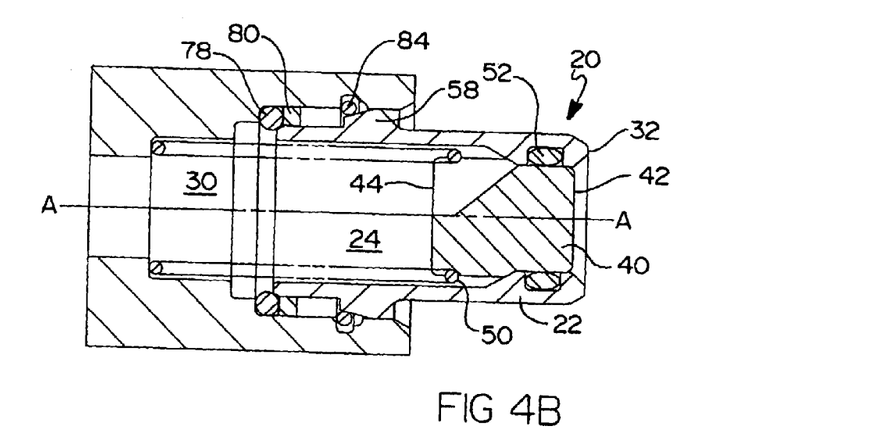
Figure 4C:
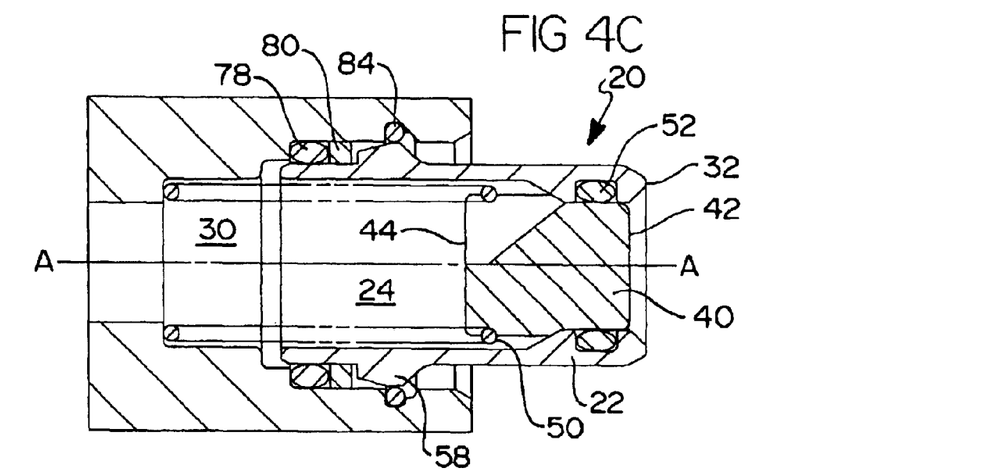
Figure 4D:
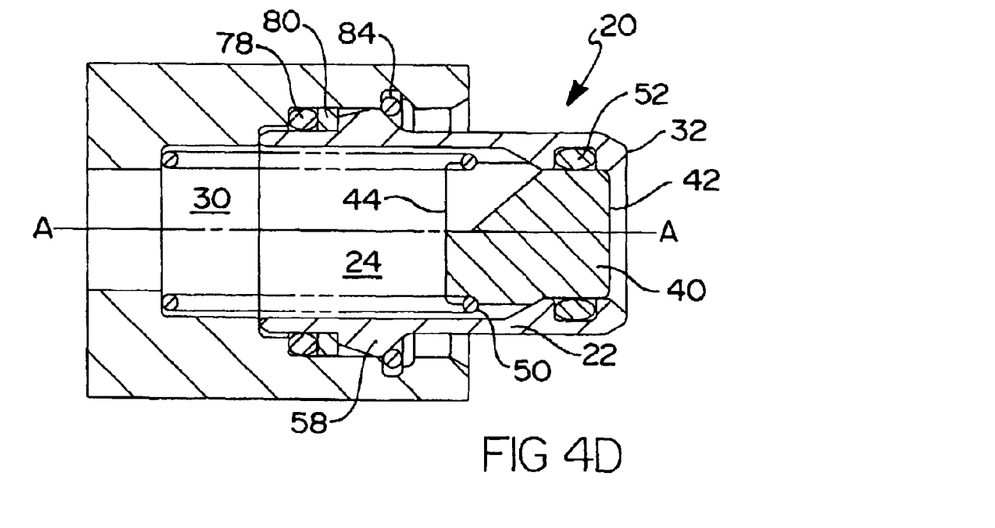
Figure 4E:
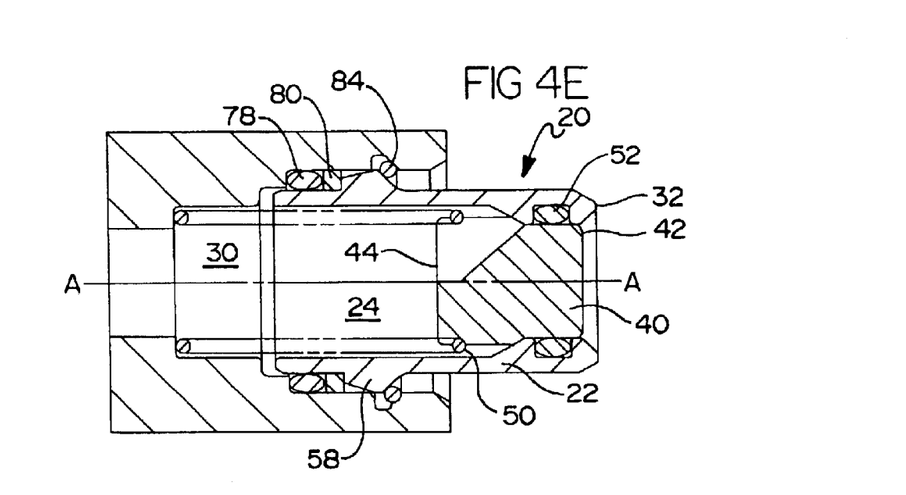
Figure 5A:
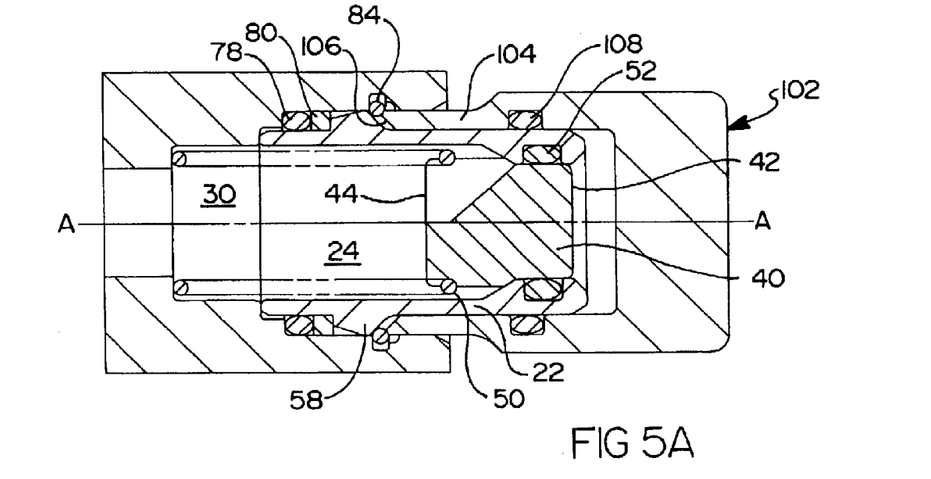
FIGS. 5A through 5E are cross-sectional views similar to FIGS. 1 and 2, but showing the relative positioning of the parts during removal of the first coupling member from the apparatus port through use of a release tool.
Figure 5B:
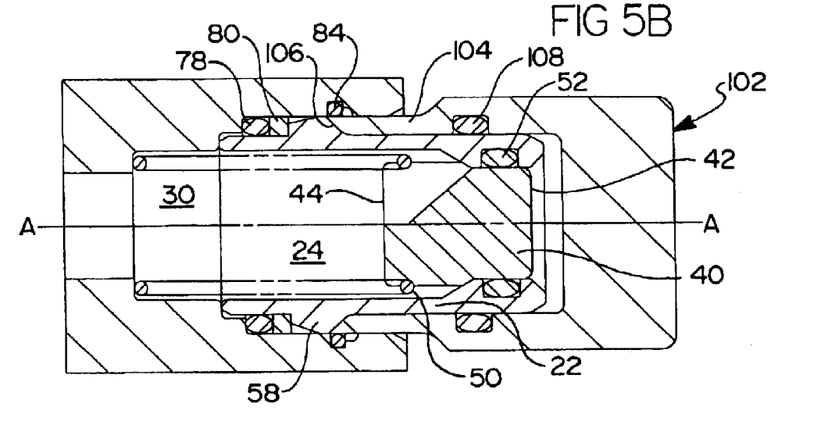
Figure 5C:
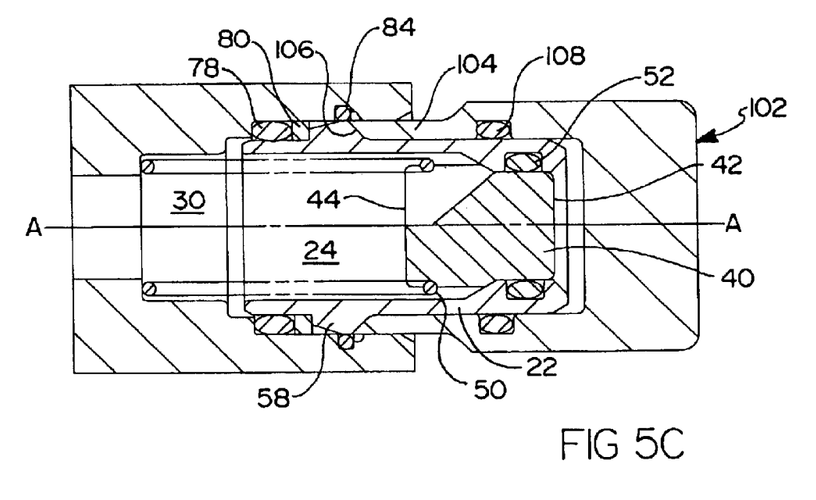
Figure 5D:
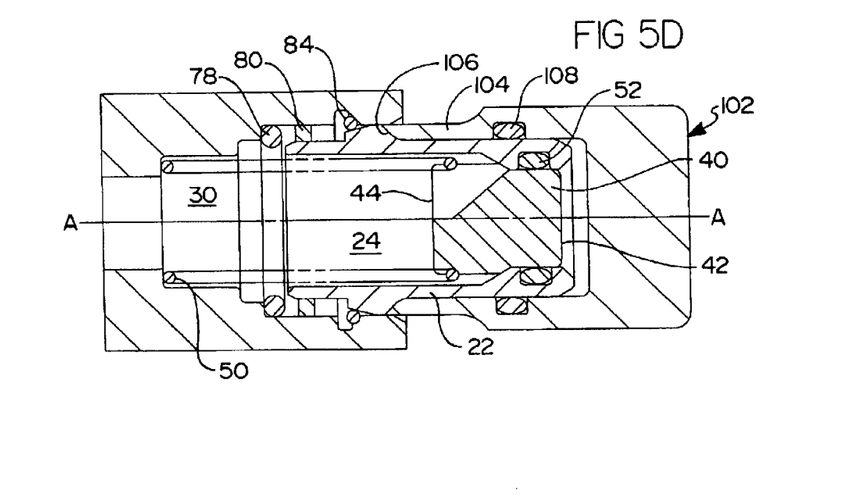
Figure 5E:
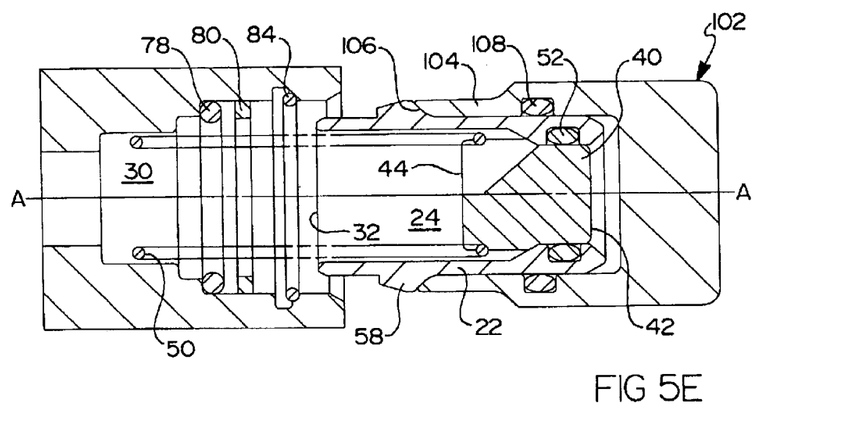

As shown in FIG. 4E, when coupling member 20 is secured in port 30, there is a space between first interior cylindrical surface 70 and trailing portion 56 of body 22. When it is desired to disconnect coupling member 20 from port 30, it is simply necessary to move a release tool 102 toward rib 58 to urge locking member 84 axially toward rib 58 and, in so doing, to be urged outwardly by tapered shoulder 66.

Figure 9:
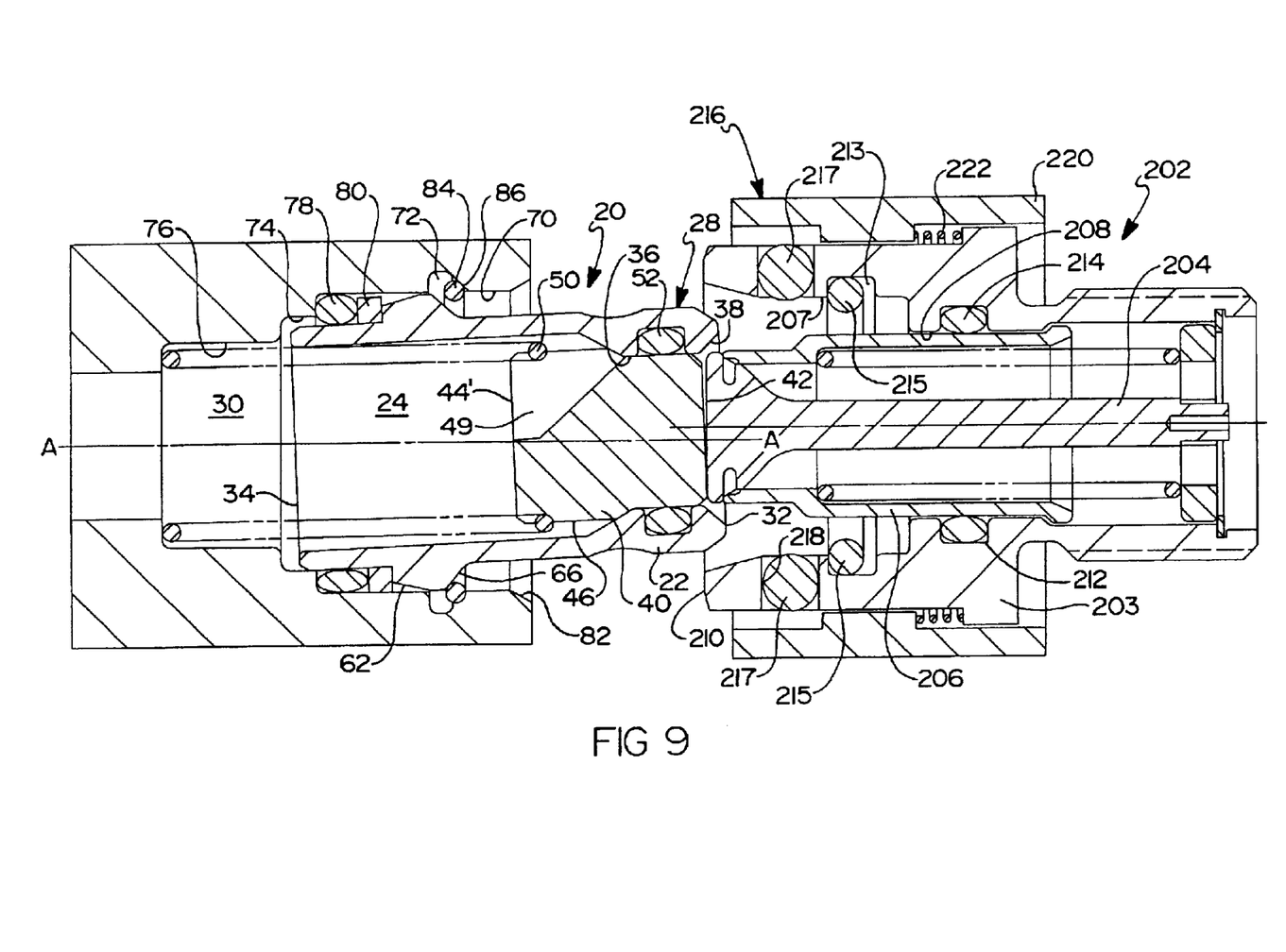
FIG. 9 is a cross sectional view of the coupling assembly showing the ability of the first member to pivot once secured in the apparatus port to accommodate misalignment of the second coupling member.

Additionally, once secured in port 30, coupling member 20 may pivot or articulate slightly within port 30, as shown in FIG. 9 to accommodate misalignment between coupling member 20 and a mating coupling member. Locking member 84 will not become displaced from its secured position between shoulder 66 and retaining surface 86, and sealing member 78 will not become disengaged from leading portion 54. This function is not possible in coupling members that are threaded into the apparatus port.

As will be appreciated, when locking member 84 has been urged to a position at least in alignment with cylindrical surface 64 of rib 58, coupling member 20 will be released from port 30 and may be removed therefrom. Inasmuch as release tool 102 has a cylindrical wall 104 having a similar thickness as rib 58 and an engagement end 106 tapered at an angle similar to that of shoulder 66, release tool 102 can be moved far enough toward rib 58 to ensure that it forces locking member 84 out of engagement with tapered shoulder 66 and into receiving groove 72, permitting release of coupling member 20 from port 30. Release member 102 includes an o-ring 108 or other compressible member to grip the trailing portion 56 of body 22 and facilitate extraction of coupling member 20 from port 30. This extraction sequence is illustrated in FIGS. 5A–5E.

As described above, coupling member 20 is depicted in the Figures as a "male" coupling member, meaning, the trailing portion 56 of coupling member is inserted into a mating or "female" coupling member to provide the apparatus in fluid communication with another device. A procedure for connecting "male" coupling member 20 to a "female" coupling member 202 is illustrated in FIGS. 8A–8D.

Female coupling member 202 includes a generally cylindrically-shaped body 203 having a stationary valve actuating member 204 secured therein. Coupling member 202 also includes a spring biased, axially moveable sleeve 206 that sealingly engages valve actuating member 204 when moved to the closed position shown in FIG. 7A. Body 203 includes a pair of interior cylindrical surfaces 207 and 208, which cascade inwardly from a first end 210 of coupling member 202. Surface 208 is provided with an outwardly extending groove 212 sized to receive an annular sealing member 214, such as an o-ring. Annular sealing member 214 sealingly engages sleeve 206 and body 203 to inhibit fluid flow therebetween. Optionally, the outermost interior cylindrical surface 207 may contain an outwardly extending groove 213 sized to receive an annular sealing member 215, such as an o-ring. Annular sealing member 215 sealingly engages trailing surface 56 of male coupling member 20 when the male and female coupling members are connected to form a redundant seal.

When female coupling member 202 is moved into initial engagement with the male coupling member 20 (FIG. 8B), valve actuating member 204 engages leading end 42 of valve member 40 and begins to actuate valve member 40 toward the open position. As the leading end of valve actuating member 204 moves past interior cylindrical surface 36, sleeve 206 engages annular sealing member 52 and chamfer 38 in body 22 (FIG. 8C). As female coupling member 202 is fully engaged with coupling member 20 (FIG. 8D), valve actuating member 204 moves valve member 40 and body 203 moves sleeve 206 to the open position to allow fluid flow through the coupling assembly (represented by the arrows in FIG. 8D).

The female coupling member depicted in FIGS. 8A–8D is provided with a ball latch mechanism 216 that includes a plurality of balls 217. Balls 217 are disposed in holes 218 positioned circumferentially around body 203 proximate first end 210. When coupling members 20, 202 are connected, balls 217 engage a groove in trailing surface 56 of coupling member 20 to secure one coupling member to the other. During connections, balls 217 are inhibited from moving radially outward in holes 218 by a release sleeve 220 that is axially moveable over body 203. To connect and disconnect female coupling member 202 from male coupling member 20, release sleeve 220 is slid axially away from first end 210 against the biasing force of a compression spring 222, allowing balls 217 to move radially outward and disengage the grooves in trailing surface 56 of coupling member 20. Fluid flow in a direction opposite that shown in FIG. 8D is also permitted.

It will be appreciated that the means for securing female coupling member 202 to male coupling member 20 is not limited to the ball latch mechanism 216 shown in FIGS. 8A–8D. Alternatively, for example, female coupling member 202 may be secured to the apparatus instead of male coupling member 20. Moreover, the configuration of the port coupling member 20 and the mating coupling member 202 shown in the Figures is not intended to limit the scope of the invention. For example, trailing portion 56 of coupling member 20 may be configured as a female coupling member, such as female coupling member 202, for receiving a corresponding male coupling member.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variation and modification is within its spirit and the scope as defined by the claims.

What is claimed is:

1. A coupling assembly removably securable to an apparatus, the apparatus including a port having an interior surface and a receiving groove extending outwardly from the interior surface, the port also including a retaining surface and a resilient locking member receivable in the receiving groove, the coupling assembly comprising:

a first coupling member releasably connectable to a second coupling member;

the first coupling member including a body having a central longitudinal channel and an inner and outer surface, the body extending along an axis from a leading portion having an internal end to a trailing portion having an external end, the leading portion of the body configured for receipt within the port of the apparatus, the trailing portion of the body configured to releasably connect the first coupling member to the second coupling member by axial movement of one of the first and second coupling members into the other;

the body including a rib that extends outwardly from the outer surface, the rib including a ramp tapering outwardly in a direction way from the internal end and away from the axis, the rib further including a shoulder tapering away from the internal end and inwardly toward the axis; and wherein the first coupling member and the port are sized such that upon insertion of the first coupling member into the port, the resilient locking member travels up the ramp and then contracts becoming trapped between the shoulder and the retaining surface in the port to secure the first coupling member to the apparatus.

2. The coupling assembly of claim 1, wherein the rib further includes a cylindrical surface that extends substantially parallel to the axis from the ramp to the shoulder.

3. The coupling assembly of claim 1, wherein the rib further includes a radial extending wall between the outer surface of the body and the ramp.

4. The coupling assembly of claim 3, wherein an annular sealing member is retained radially between the interior surface of the port and the outer surface of the body and axially between the interior surface of the port and the radially extending wall.

5. The coupling assembly of claim 1, wherein the shoulder of the rib includes first and second tapered surfaces and a cylindrical surface intermediate the tapered surfaces.

6. The coupling assembly of claim 1, wherein the first coupling member includes a valve member received in the longitudinal channel of the body, the valve member moveable between a closed position and an open position.

7. The coupling assembly of claim 6, wherein the valve member is biased into the closed position by a resiliently compressible member that is disposed between the apparatus and the valve member when the first coupling member is secured in the port.

8. The coupling assembly of claim 6, wherein the valve member includes at least one channel to allow passage of a fluid therethrough when the valve member is moved to the open position.

9. The coupling assembly of claim 6, wherein at least one of the valve member and the inner surface of the body includes an annular sealing member to inhibit the passage of a fluid between the valve member and the body when the valve member is moved to the closed position.

10. The coupling assembly of claim 6, wherein the second coupling member includes a valve actuating member for engaging the valve member and moving the valve member to the open position when the first and second coupling members are connected.

11. The coupling assembly of claim 10, wherein the second coupling member further includes a spring biased valve sleeve that seals against the body of the first coupling member when the first and second coupling members are connected.

12. The coupling assembly of claim 10, wherein the second coupling member includes a ball latch mechanism for securing the second coupling member to the first coupling member.

13. A port coupling member configured to be secured in a port defined in an apparatus, the port including an interior surface and a receiving groove extending outwardly from the interior surface, the port also including a retaining surface and a resilient locking member being receivable in the receiving groove, the port coupling member defining one half of a releasable coupling assembly that includes the port coupling member and a mating coupling member, the port coupling member comprising:

a body having a central longitudinal channel and an inner and outer surface, the body extending along an axis from a leading portion having an internal end to a trailing portion having an external end, the leading portion of the body configured for receipt within the port of the apparatus, the trailing portion of the body configured to releasably connect the port coupling member to the mating coupling member by axial movement of one of the port and mating coupling members into the other;

the body including a rib that extends outwardly from the outer surface, the rib including a ramp tapering outwardly in a direction way from the internal end and away from the axis, the rib further including a shoulder tapering away from the internal end and inwardly toward the axis; and wherein the port coupling member and the port are sized such that upon insertion of the port coupling member into the port, the resilient locking member travels up the ramp and then contracts becoming trapped between the shoulder and the retaining surface in the port to secure the coupling member in the apparatus.

14. The coupling member of claim 13, wherein the rib further includes a cylindrical surface that extends substantially parallel to the axis from the ramp to the shoulder.

15. The coupling member of claim 13, wherein the rib further includes a radial extending wall between the outer surface of the body and the ramp.

16. The coupling member of claim 13, wherein at least one annular sealing member is retained radially between the interior surface of the port and the outer surface of the body and axially between the interior surface of the port and the radially extending wall.

17. The coupling member of claim 13, wherein the shoulder of the rib includes first and second tapered surfaces and a cylindrical surface intermediate the tapered surfaces.

18. The coupling member of claim 13, wherein the port coupling member includes a valve member received in the longitudinal channel of the body, the valve member moveable between a closed position and an open position.

19. The coupling member of claim 18, wherein the valve member is biased into the closed position by a resiliently compressible member that is disposed between the apparatus and the valve member when the port coupling member is secured in the port.

20. The coupling member of claim 18, wherein the valve member includes at least one channel to allow passage of a fluid therethrough when the valve member is moved to the open position.

21. The coupling member of claim 18, wherein at least one of the valve member and the inner surface of the body includes an annular sealing member to inhibit the passage of a fluid between the valve member and the body when the valve member is moved to the closed position.

22. A combination apparatus and first coupling member removeably secured in the apparatus, the first coupling member defining one half of a releasable coupling assembly that includes the first coupling member and a second coupling member, the combination comprising:

a port defined in the apparatus, the port including an interior surface and a receiving groove extending outwardly from the interior surface, the port also including a retaining surface;

a resilient locking member having a first end and a second end, the resilient locking member being receivable in the receiving groove;

the first coupling member including a body having a central longitudinal channel and an inner and outer surface, the body extending along an axis from a leading portion having an internal end to a trailing portion having an external end, the leading portion of the body configured for receipt within the port of the apparatus, the trailing portion of the body configured to releasably connect the first coupling member to the second coupling member by axial movement of one of the first and second coupling members into the other;

the coupling member and the port being sized such that upon insertion of the coupling member into the port, the resilient locking member travels up the ramp and then contracts to engage the shoulder becoming trapped between the shoulder and the retaining surface in the port to retain the coupling member in the apparatus.

23. The combination of claim 22, wherein the retaining surface is a curved surface.

24. The combination of claim 23, wherein the curved surface extends from the receiving groove.

25. The combination of claim 22, wherein the retaining surface is a chamfer that extends inwardly toward the axis in a direct toward the external end.

26. The combination of claim 25, wherein the chamfer extends from the receiving groove.

27. The combination of claim 22, further including a locking member retaining groove define by the interior surface of the port, the retaining surface defining at least a portion of the retaining groove.

28. The combination of claim 27, wherein the retaining groove adjoins the receiving groove.

29. The combination of claim 22, wherein the rib further includes a cylindrical surface that extends substantially parallel to the axis from the ramp to the shoulder.

30. The combination of claim 22, wherein the rib further includes a radial extending wall between the outer surface of the body and the ramp.

31. The combination of claim 30, wherein at least one annular sealing member is retained radially between the interior surface of the port and the outer surface of the body and axially between the interior surface of the port and the radially extending wall.

32. The combination of claim 22, wherein the shoulder of the rib includes first and second tapered surfaces and a cylindrical surface intermediate the tapered surfaces.

33. The combination of claim 22, wherein the coupling member includes a spring biased valve member received in the longitudinal channel of the body, the valve member moveable between a closed position and an open portion.

34. The combination of claim 33, wherein the valve member is biased into the closed position by a resiliently compressible member that is disposed between the apparatus and the valve member when the coupling member is secured in the port.

35. The combination of claim 33, wherein the second coupling member includes a valve actuating member for engaging the valve member and moving the valve member to the open position when the first and second coupling members are connected.

36. The combination of claim 35, wherein the second coupling member further includes a spring biased valve sleeve that seals against the body of the first coupling member when the first and second coupling members are connected.

* * * * *